United States Patent Office 3,407,878
Patented Oct. 29, 1968

3,407,878
LOST CIRCULATION CONTROL
Charles J. Engle, Bartlesville, Okla., assignor to Phillips Petroleum Company, a corporation of Delaware
No Drawing. Filed Sept. 2, 1966, Ser. No. 576,845
9 Claims. (Cl. 166—30)

ABSTRACT OF THE DISCLOSURE

A method of sealing an underground formation penetrated by a well wherein drilling fluid is lost by introducing into the formation a hydratable clay and a polyalkylene glycol polymer under conditions which are suitable to permit the polymer to flocculate and congeal the clay within the formation, thereby sealing the formation and preventing further drilling fluid loss This invention relates to the control of lost circulation in drilling wells. In one aspect it relates to a method of sealing zones or formations of lost circulation.

In drilling wells, especially wells for producing oil or gas from underground formations, a problem sometimes arises when formations are encountered into which the drilling fluid is lost. Such formations are known as lost circulation formations or thief zones. Upon encountering a thief zone drilling operations are usually shut down and drilling is not generally resumed until the thief zone is closed off and circulation of the drilling fluid re-established.

Broadly, my invention comprises a method of sealing an underground formation which is causing the loss of drilling fluid by introducing into the formation a hydratable clay and a polyalkylene glycol polymer under conditions which are suitable to permit the polymer to flocculate and congeal the clay within the formation, thereby sealing the formation and preventing further drilling fluid loss.

An object of the invention is to prevent or remedy lost circulation in a drilling well.

Another object is to place lost circulation materials in a well.

Other aspects, objects and advantages of my invention will be apparent to one skilled in the art from a study of the written description and the claims.

According to the invention lost circulation is prevented by introducing a composition comprising a hydratable clay and nonsaline water into said formation, and thereafter introducing a second composition comprising a polyalkylene glycol and nonsaline water into said formation. Upon both compositions entering the formation and mixing, the polyalkylene glycol composition causes the hydratable clay to flocculate and congeal, thereby sealing off the formation. By nonsaline water is meant an aqueous fluid containing an insufficient amount of soluble salts of any kind to prevent hydratable clays from functioning satisfactorily as viscosity and fluid-loss controlling agents.

Further according to the invention, lost circulation control materials such as sugar cane fibers, flax, straw, ground hemp, shredded paper, paper pulp, cellophane strips, ground plastics, expanded pyrolite, silica slag, wood, wood bark, wood fibers, grape extraction residue, cotton seed hulls, cotton bolls, gin cotton fibers, and linters are added to the polyalkylene glycol composition, thereby forming a nucleus around which the hydratable clay flocculates and congeals and thereby seals off the formation.

Further according to my invention, a barrier fluid is injected between the polyalkylene glycol composition and the hydratable clay composition to avoid premature flocculation and congealing of the hydratable clay due to turbulent flow prior to entry into the formation of lost circulation.

Further according to my invention, lost circulation materials are placed in a well packaged in plastic bags and circulated to the point of lost circulation. The bags can be of various sizes. For example, a fluid composition comprising polyalkylene glycol and nonsaline water can be packaged in plastic bags and hydratable clay composition packaged in separate plastic bags. When the plastic bags are then inserted into the bore of the well and caused to pass to the formation of lost circulation where abrasion and the sudden differential in pressure in the thief zone causes the plastic bags to rupture, the polyalkylene glycol is permitted to contact the clay to flocculate and congeal the clay, thus forming a solid mass to seal said formation. The plastic bags containing the polyalkylene glycol composition and hydratable clay composition which do not enter the formation are transported by the drilling fluid to the surface where they are removed from the drilling fluid as, for example, by means of a mechanical shale shaker. Thus, only those bags containing the hydratable clay composition and the polyalkylene glycol composition entering the formation are retained within the well. The bags which rupture provide additional lost circulation material.

The bags containing the above-mentioned fluid composition can range in size from ¼ inch in diameter to 2 inches in diameter. The variation in size allows all sizes of bags to enter large cracks and crevices in the thief zone while the smaller size bags can enter the small cracks and crevices.

Another way of proceeding is to place the bags in a lubricator positioned downstream from a pump. When the thief zone is encountered in the drilling operation, valves on the lubricator are opened thereby allowing the bags to enter the well and thus the thief zone. The bags once in the well can be forced to the thief zone by pumping a mud solution behind the bags or the pump can be shut down and a vacuum, created within the well by the loss of fluid flowing into the thief zone, will cause the bags to flow down to the thief zone where the sudden pressure differential in the thief zone and the abrasive action in the thief zone due to turbulence in the thief zone cause the bags to rupture, thereby releasing the fluid composition and mixing the same thus causing the clay to flocculate and congeal and form a seal in the thief zone. The bags can be introduced into a well by placing the bags in the open upper end of the drill string when drilling operations are not in progress and forced down to the thief zone by a subsequently added slug of fluid, such as water.

An alternative method of introducing the bags into the thief zone can be by slowly pumping a drilling mud containing the bags down the drill string and thus allowing them to flow out of the drill string and into the thief zone where the bags are then ruptured.

Polyalkylene glycols, e.g., poly(ethylene oxide), which can be used in the practice of the present invention, should have a molecular weight in the range of 3,000,000 to 7,000,000. The preferred polyalkylene glycol polymers are selected from the group consisting of poly(ethylene oxide), poly(propylene oxide), and poly(butylene oxide).

In one way of proceeding, a fluid composition in the form of a mixture or slurry is prepared by adding quantities of bentonite to nonsaline water. Effective amounts of bentonite generally are at least 1 percent by weight to 8 percent by weight. A mixture or slurry having 3 to 7 percent by weight bentonite has good gel and pumpability characteristics.

A second fluid composition is prepared by dispersing quantities of polyethylene oxide in an aqueous carrier medium. Effective amounts of polyethylene oxide are at least 0.1 percent by weight to 3 percent by weight. However it has been found that a mixture or slurry containing 1 percent by weight polyethylene oxide has good gel and pumpability characteristics. Further, it has been determined that the polyethylene oxide should have a reduced viscosity of 45–75. Polyethylene oxide having a reduced viscosity of 45–75 indicates a polyethylene oxide having a molecular weight in the range of 3,000,000 to 7,000,000.

By the term "reduced viscosity" as used herein is meant a value indicative of molecular weight obtained by dividing the specific viscosity by the concentration of a polyalkylene glycol polymer in a solution, the concentration being measured in grams of polymer per 100 milliliters of solvent at a given temperature. The reduced viscosities herein referred to are measured at a concentration of 0.2 gram of polyethylene oxide in 100 milliliters of acetonitrile at 30° C. The reduced viscosities for other polyalkylene glycols are conveniently measured in benzene.

After the polyethylene oxide is dispersed in an aqueous medium, lost circulation material such as sugar cane fibers, flax, straw, ground hemp, shredded paper, paper pulp, cellophane strips, ground plastics, expanded pyrolite, silica slag, wood, wood bark and fibers, grape extraction residue, cotton seed hulls, cotton bolls, cotton fibers, and cotton linters, or any of the other commonly used materials capable of adding bulk can be added.

After the two fluid compositions are prepared, the first fluid composition containing bentonite can be introduced into the well to be treated, such as by pumping the composition downwardly through a well tubing extending to a desired depth in the well. The fluid composition is then caused or allowed to contact and enter the lost circulation formation to be treated. The second fluid composition containing polyethylene oxide and lost circulation materials can then be introduced into the well to be treated in like manner. As the second fluid composition contacts and enters the lost circulation formation the turbulence created by the pressure differential in the formation causes the two fluids to mix. Upon such mixing action the poly(ethylene oxide) causes the bentonite to flocculate and congeal with the lost circulation materials, thereby sealing the formation.

Due to the flocculating characteristics of bentonite when mixed with polyethylene oxide the fluid compositions containing these materials must be introduced into the well in such a manner that permature flocculation and coagulation of the bentonite does not occur. This can be achieved in several ways.

In order to prevent premature flocculation and coagulation, the fluid compositions are slowly pumped into the well by laminar flow thereby preventing the mixture of the two fluid compositions by turbulence created by the pumping action. The kinetics of laminar fluid flow are fully described in Crane Co., Technical Paper No. 410, "Flow of Fluids Through Valves, Fittings, and Pipe." pp. 1–4. Using these principles, the two fluids can be separately introduced into the thief zone thereby preventing premature flocculation and coagulation of the clay.

A second method of preventing premature flocculation of the bentonite by poly(ethylene oxide) is by employing a buffer solution between the two fluid compositions. The buffer solution so selected should be nonreactive with both the polyethylene oxide composition and the bentonite composition. Examples of nonreactive buffer solutions suitable for preventing the mixing of the two compositions are water and diesel oil.

In order to define additive concentrations and slurry composition a series of tests, shown in Table I, were run. In these tests, poly(ethylene oxide) and clay concentrations were varied and shear strength values of the resultant plasticized muds noted. Tests 13 through 16 were made to determine the effects of polyethylene oxide concentrations on 4 percent bentonite suspensions.

TABLE I.—POLYETHYLENE OXIDE TESTS FOR LOST CIRCULATION CONTROL

| Test Number | Percent Bentonite | Percent Kaolin | Percent Low-yield High Calcium Clay | Lb./Bbl. Fe-Smq [1] | Lb./Bbl. Q-Broxin [2] | Lb./Bbl. NaOH | Lb./Bbl. Walnut Hulls | Lb./Bbl. Polyethylene Oxide [3] | Shear Strength, lb./100 ft.[2] | Fluid Loss [4] Before Sealing cc |
|---|---|---|---|---|---|---|---|---|---|---|
| 1 | 2 | | | | | | | 0.7 | 86 | |
| 2 | 4 | | | | | | | 0.7 | 100 | |
| 3 | 6 | | | | | | | 0.7 | 300 | |
| 4 | 2 | | | | | | | 2 | 68 | |
| 5 | 4 | | | | | | | 2 | 140 | |
| 6 | 6 | | | | | | | 2 | 300 | |
| 7 | 2 | 20 | | | | | | 0.7 | 40 | |
| 8 | 2 | | 20 | | | | | 0.7 | 66 | |
| 9 | 4 | 20 | | | | | | 2 | 180 | |
| 10 | 4 | | 20 | | | | | 2 | 300 | |
| 11 | 4 | 20 | | | 5 | 0.75 | | 2 | 140 | |
| 12 | 4 | | 20 | | 5 | 0.75 | | 2 | 45 | |
| 13 | 4 | | | | | | | 0.1 | 12 | |
| 14 | 4 | | | | | | | 0.3 | <10 | |
| 15 | 4 | | | | | | | 0.5 | 45 | |
| 16 | 4 | | | | | | | 1 | 16 | |
| 17 | 4 | 20 | | 0 | | | 40 | | | 180 |
| 18 | 4 | 20 | | | 5 | 0.75 | 40 | | | 60 |
| 19 | 4 | 20 | | 0 | | | 40 | 2 | | 25 |
| 20 | 4 | 20 | | | 5 | 0.75 | 40 | 2 | 300 | 35 |

[1] Iron complex of sulfomethylated quebracho, Laboratory sample. [2] Lignosulfonate. [3] Polyethylene oxide added last. [4] Measurements made using a modified Baroid Press for lost circulation control tests containing 2½ inch layer of 4 mm. glass beads and operated at 100 p.s.i.

Referring to Tests 1 through 12, it may be seen that the strongest gels were developed in either 6 percent bentonite or 4 percent bentonite and 20 percent high calcium, low yield clay. Tests 2, 5, 13, 14, 15 and 16 illustrate effects of additive dosage. Flocculation occurred for all dosage levels and the shear strengths were oriented with dosages although somewhat irregular. This is attributed to the fact that, at dosages above 0.5 pound per barrel, fluocculation occurred before the additive was completely dispersed. The polyethylene oxide is added to the clay while being stirred on the malt mixer, and upon flocculation stirring must be discontinued as the plasticized clay "crawls" up the stirrer shaft and is thrown out of the mixing container.

Tests 11 and 12 illustrate that the additive is effective in the presence of conventional mud thinners.

Tests 17 through 20 illustrate the use of polyethylene oxide as a lost circulation control material additive to a clay composition containing 4 percent by weight bentonite and 20 percent by weight kaolin. Walnut hulls were added to the polyethylene oxide composition. The samples were placed in a modified Baroid mud press operated at 100 p.s.i. which supported a 2½-inch layer of 4-millimeter glass beads to simulate a vugular formation. The volume of fluid driven through this porous bed prior to seal development is indicative of the additive's effectiveness. More efficient sealing in the presence of polyethylene oxide is indicated by the lower filter losses, 25 and 33 cc. The filtrate from Test 20 contained only water and partially dispersed polyethylene oxide. All other filtrates contained clay solids.

All test muds in the examples herein had shear strengths of less than 10 pounds per 100 square feet before polyethylene oxide was added.

Further tests were performed in a manner similar to those mentioned above, using mixtures of polyethylene oxide and bentonite combined in varying percentages by weight in water. Increased gel stiffness was obtained the larger the percentage of bentonite present. However, 0.06–1 percent polyethylene oxide was found effective in precipitating bentonite from a bentonite composition containing 0.45 to 6 percent by weight bentonite. Suspensions containing more than 1 percent polyethylene oxide were quite viscous and bentonite compositions containing over 8 percent clay are not pumpable. Low yield clays produce pumpable slurries containing up to 30 percent solids.

In operation, the poly(ethylene oxide) composition is introduced in an amount sufficient to supply 0.3 to 11 lbs./bbl. of polymer per 3.5 to 30 lbs./bbl. of bentonite present in the hydratable clay composition. In using a low yield hydratable clay, the poly(ethylene oxide) composition is introduced in an amount sufficient to supply 0.3 to 11 lbs./bbl. of polymer per 3.5 to 80 lbs./bbl. of low yield hydratable clay.

Although the above examples have illustrated admixing compositions containing polyethylene oxide and clay suspensions to produce a seal in a thief zone, it is also within the scope of the present invention that the polyethylene oxide, hydratable clay and conventional lost circulation materials, such as nut hulls, cottonseed hulls, chopped polyethylene, cellophane scraps, wood scraps, etc., be packaged in small polyethylene bags and pumped down the drill stem. The bags would preferably be of assorted sizes and those not entering the feed zone would return to the surface and be removed from the mud system by the shale shaker. The bags, on entering the feed zone, would be ruptured by abrasion and the high differential pressures developed in the feed zone.

That which is claimed is:

1. A process for sealing an underground formation penetrated by a well wherein drilling fluid is lost comprising the steps of introducing into said formation a first fluid composition comprising a hydratable clay and non-saline water; introducing into said formation a second fluid composition comprising a polyalkylene glycol polymer having a molecular weight between 3 million and 7 million and an aqueous media in an amount sufficient to interact with said first fluid composition to cause flocculation and coagulation of said clay, thereby forming a solid mass to seal said formation; said first and second fluid compositions being introduced into said formation in such a way as to prevent the interaction thereof prior to the entry of said first and second fluid compositions into said formation.

2. A process for sealing an underground formation penetrated by a well wherein drilling fluid is lost comprising the steps of introducing into said formation a first fluid composition comprising a hydratable clay and non-saline water; introducing into said formation a second fluid composition comprising a polymer selected from the group consisting of poly(ethylene oxide), poly(propylene oxide), and poly(butylene oxide) and an aqueous media in an amount sufficient to interact with said first fluid composition to cause flocculation and coagulation of said clay, thereby forming a solid mass to seal said formation; said first and second fluid compositions being introduced into said formation in such a way as to prevent the interaction thereof prior to the entry of said first and second fluid compositions into said formation.

3. A process according to claim 2 which includes the step of introducing a barrier fluid into said formation intermediate the step of introducing said first fluid composition and the step of introducing said second fluid composition to prevent premature flocculation and coagulation of said clay prior to entry of said first and second fluid compositions into said formation.

4. A process according to claim 2 wherein said first and second fluid compositions are separately introduced into said formation by laminar flow so as to prevent premature flocculation and coagulation of said clay prior to the entry of said first and second fluid compositions into said formation.

5. A process according to claim 2 further including the step of mixing a solid lost circulation material with said second fluid composition prior to the introduction of said second fluid composition into said formation.

6. A process according to claim 2 further including the steps of sealing said first and said second fluid compositions in separate plastic containers prior to the introduction of said first and second fluid compositions into said formation, introducing said containers into said formation, rupturing said containers in said formation to cause the interaction of said first and second fluid compositions, thereby sealing said formation.

7. A process according to claim 2 wherein said hydratable clay is bentonite, and said second fluid composition is a solution of poly(ethylene oxide) and non-saline water.

8. A process according to claim 7 wherein said bentonite is present in the range of 1–8 percent by weight.

9. A process according to claim 2 wherein said polymer has a molecular weight in the range of 3 million to 7 million and is present in said composition in the range of 0.06 to 3 percent by weight.

References Cited

UNITED STATES PATENTS

| | | | |
|---|---|---|---|
| 1,460,788 | 7/1923 | Carman. | |
| 2,042,011 | 5/1936 | Loomis | 166—30 |
| 2,065,512 | 12/1936 | Cannon | 166—30 X |
| 3,028,913 | 4/1962 | Armentrout | 166—29 |
| 3,175,628 | 3/1965 | Dellinger | 175—72 |
| 3,190,373 | 6/1965 | Weathersby | 175—72 |
| 3,323,589 | 6/1967 | Harvey | 166—30 X |
| 3,342,262 | 9/1967 | King et al. | 166—29 |

OTHER REFERENCES

Sawdon, Wallace A.: "Lost Circulation in Rotary Holes—A Problem Requiring Specific Treatment," in Petroleum Engineer, February 1963, pp. 27–30.

CHARLES E. O'CONNELL, Primary Examiner.

IAN A. CALVERT, Assistant Examiner.